(12) United States Patent
Rocklage et al.

(10) Patent No.: US 9,936,718 B2
(45) Date of Patent: Apr. 10, 2018

(54) MOLD WITH OPTIMIZED HEAT TRANSFER PROPERTIES

(71) Applicant: Kraft Foods R&D, Inc., Deerfield, IL (US)

(72) Inventors: Bernard Rocklage, Munich (DE); Michael Talmon-Gros, Munich (DE); Ulrich Loeser, Munich (DE); Rudolf Hauger, Munich (DE)

(73) Assignee: Kraft Foods R&D, Inc., Deerfield, IL (US)

( * ) Notice: Subject to any disclaimer, the term of this patent is extended or adjusted under 35 U.S.C. 154(b) by 32 days.

(21) Appl. No.: 14/400,779

(22) PCT Filed: May 23, 2013

(86) PCT No.: PCT/EP2013/060607
§ 371 (c)(1),
(2) Date: Nov. 12, 2014

(87) PCT Pub. No.: WO2013/178526
PCT Pub. Date: Dec. 5, 2013

(65) Prior Publication Data
US 2015/0132461 A1    May 14, 2015

(30) Foreign Application Priority Data
May 30, 2012 (GB) .................................. 1209662.4

(51) Int. Cl.
*A23G 1/22* (2006.01)
*A23G 3/02* (2006.01)
(Continued)

(52) U.S. Cl.
CPC .............. *A23G 1/22* (2013.01); *A23G 1/005* (2013.01); *A23G 1/0079* (2013.01);
(Continued)

(58) Field of Classification Search
CPC ...... A23G 3/34; A23G 3/0034; A23G 3/0031; A23G 3/0268; A23G 1/0086; A23G 1/005; A23G 1/0079; A23G 1/22; A23G 3/02
(Continued)

(56) References Cited

U.S. PATENT DOCUMENTS

RE15,608 E  *  5/1923  Burroughs .............. B29C 33/04
                                                       165/138
2,428,660 A  *  10/1947 Falk ........................ B22D 7/08
                                                       164/348
(Continued)

FOREIGN PATENT DOCUMENTS

DE          19922439 A1     5/2000
DE       102009032625 B3    1/2011
(Continued)

OTHER PUBLICATIONS

Canadian Patent Office, Office Action, dated Oct. 6, 2017, 3 pages. (Year: 2017).*
(Continued)

*Primary Examiner* — Yogendra N Gupta
*Assistant Examiner* — Emmanuel S Luk
(74) *Attorney, Agent, or Firm* — Fitch, Even, Tabin & Flannery LLP

(57) ABSTRACT

A mold (1) for the production of confectionery products, comprising a top surface (2) having cavities (2a) and an opposite bottom surface (3), comprising at least one protruding element (5) at the bottom surface (3) of the mold (1) for increasing the heat transfer rate between the mold (1) and a fluid flowing along the bottom surface (3).

12 Claims, 6 Drawing Sheets

(51) Int. Cl.
*A23G 3/34* (2006.01)
*A23G 1/00* (2006.01)
(52) U.S. Cl.
CPC ......... *A23G 1/0086* (2013.01); *A23G 3/0031* (2013.01); *A23G 3/0034* (2013.01); *A23G 3/02* (2013.01); *A23G 3/0268* (2013.01); *A23G 3/34* (2013.01); *A23V 2002/00* (2013.01)
(58) Field of Classification Search
USPC ...................................................... 249/79, 81
See application file for complete search history.

(56) References Cited

U.S. PATENT DOCUMENTS

| | | | | | |
|---|---|---|---|---|---|
| 2,602,210 | A | * | 7/1952 | Rumble | E04G 9/10 249/189 |
| 2,688,158 | A | * | 9/1954 | Stratton | B29C 44/38 249/81 |
| 2,744,391 | A | * | 5/1956 | Newenham | F25D 31/002 165/133 |
| 2,767,449 | A | * | 10/1956 | Tueth | B22C 9/06 164/321 |
| 2,939,299 | A | * | 6/1960 | Sherbloom | A23G 9/221 249/111 |
| 3,233,562 | A | | 2/1966 | Nakamura | |
| 3,358,588 | A | * | 12/1967 | Rossnan | A47J 27/04 126/20 |
| 3,778,018 | A | | 12/1973 | Abalo | |
| 3,888,647 | A | * | 6/1975 | Breeden | C03B 9/3875 165/154 |
| 4,456,573 | A | * | 6/1984 | Ragazzini | B29C 44/3434 249/113 |
| 4,562,991 | A | * | 1/1986 | Wu | A23G 9/083 249/117 |
| 4,638,858 | A | * | 1/1987 | Chu | F28F 13/12 165/181 |
| 4,781,555 | A | * | 11/1988 | Cook | B29C 33/048 249/79 |
| 4,899,805 | A | * | 2/1990 | Iversen | B22D 27/04 164/348 |
| 5,032,076 | A | * | 7/1991 | Jackson, Jr. | B29C 33/046 249/79 |
| 5,705,217 | A | * | 1/1998 | Aasted | A23G 1/205 425/292 |
| 5,744,173 | A | * | 4/1998 | Sterett | B22C 9/00 249/79 |
| 6,000,831 | A | | 12/1999 | Triplett | |
| 6,345,801 | B1 | * | 2/2002 | Boulet | B22D 5/04 164/330 |
| 6,578,627 | B1 | * | 6/2003 | Liu | F28F 13/12 165/109.1 |
| 6,942,477 | B2 | * | 9/2005 | Wood | B29D 29/00 249/79 |
| 7,647,945 | B2 | * | 1/2010 | Finkel | B29C 45/7312 138/38 |
| 7,647,975 | B2 | * | 1/2010 | Messick | E21B 43/123 166/317 |
| 7,964,129 | B1 | * | 6/2011 | James | B22C 9/065 165/104.19 |
| 8,017,059 | B2 | * | 9/2011 | Matsen | B21D 37/16 249/78 |
| 8,057,207 | B2 | * | 11/2011 | Zorovich | A23G 9/221 249/111 |
| 2005/0006063 | A1 | * | 1/2005 | Zhang | F28F 1/128 165/109.1 |
| 2006/0117782 | A1 | * | 6/2006 | Rini | F25B 1/00 62/310 |
| 2007/0062674 | A1 | * | 3/2007 | Ippoushi | H01L 23/473 165/80.4 |
| 2007/0110858 | A1 | * | 5/2007 | Fiori | A23G 1/0076 426/306 |
| 2008/0289359 | A1 | * | 11/2008 | Godowski | A47G 23/0683 62/457.6 |
| 2009/0028985 | A1 | * | 1/2009 | Finkel | B29C 45/7312 425/552 |
| 2009/0053370 | A1 | * | 2/2009 | Smith | A23G 1/0086 426/104 |
| 2010/0183789 | A1 | | 7/2010 | Zorovich | |
| 2011/0045114 | A1 | | 2/2011 | Whetstone, Jr. | |
| 2012/0006523 | A1 | * | 1/2012 | Masahiro | B21C 23/14 165/185 |
| 2015/0174794 | A1 | * | 6/2015 | McClintock | B29C 45/73 264/328.16 |
| 2016/0252286 | A1 | * | 9/2016 | Jeong | F25C 1/18 62/130 |

FOREIGN PATENT DOCUMENTS

| | | |
|---|---|---|
| EP | 0230861 A2 | 8/1987 |
| EP | 0429969 A1 | 6/1991 |
| EP | 1798502 A2 | 6/2007 |
| WO | 98034773 A1 | 8/1998 |

OTHER PUBLICATIONS

Canadian Patent Office, Office of Action, dated Feb. 6, 2017, 4 pages. (Year: 2017).*
International Preliminary Report on Patentability, dated Dec. 2, 2014 for PCT/EP2013/060607 (7 pgs.).
International Search Report, dated Aug. 29, 2013 for PCT/EP2013/060607 (4 pgs.).
Fryer, P.J., et al.; "Modelling temperature distribuitons in cooling chocolate molds;" (12 pgs.).
UK Intellectual Property Office Search Report, dated Sep. 5, 2012 for 1209662.4 (4 pgs.).
Tewkesbury et al.; Modelling temperature distributions in cooling chocolate moulds; Chemical Engineering Science; 2000; pp. 3123-3132; vol. 55 (10 pgs.).
"Guideline: Energy Efficiency in the Confectionery Industry," Working Group "Machines and Equipment in the Confectionery Industry," Oct. 2009 (12 pgs.).

* cited by examiner

MOLD WITH OPTIMIZED HEAT TRANSFER PROPERTIES

CROSS REFERENCE TO RELATED APPLICATIONS

This application is a U.S. national phase application of International Application No. PCT/EP2013/060607, filed May 23, 2013, which claims benefit from Great Britain Application 1209662.4, filed May 30, 2012, which are hereby incorporated herein by reference in their entirety.

TECHNICAL FIELD

The present invention relates to a mold for the production of confectionery products such as chocolate.

BACKGROUND OF THE INVENTION

Molds for confectionery products are one of the most important parts of the confectionery production process. Molds determine the design of the product, including its final visual quality, as they are the carrier of the confectionery product from the first deposit of a liquid confectionery mass until the final confectionery product reaches the packaging area. During this process the mold/product system is typically cooled down or heated up several times by passing it through a processing unit which is divided into zones having different temperatures, the different temperatures being attained using a series of cooling/heating units.

The heat transfer rate between the mold/product system and the cooling/heating air is of fundamental importance to the energy consumption of the processing unit and the final quality of the confectionery product.

Conventional molds are generally designed as having a top surface which contains specific cavities for the liquid confectionery mass, sides which comprise the outer rim and a bottom surface which has various numbers of lengthwise and crosswise bars for achieving sufficient rigidity and stability (less bending).

Conventional molds mostly consist of poly-carbonate (e.g. Makrolon, Lexan or Tarflon). Makrolon represents generally the preferred material. Said polycarbonates are food grade, rigid and enable a surface roughness small enough to achieve a glossy chocolate surface.

However, such mold designs are not optimal regarding the fluid dynamic properties, since dead zones and uncontrolled stationary vortices are generated which inhibit heat transfer (see FIG. 1). In general, fluid-dynamic and energetic aspects of the mold as carrier of the confectionery product are not considered on an industrial scale. Accordingly, the cooling and heating cabinets and their process capabilities are adapted regardless of the high level of energy consumption.

A further disadvantage of conventional molds for the production of confectionery products is that it is difficult to realize a homogenous cooling/heating of the confectionery mass and thus, a homogenous solidifying during the production process, since the molds have different wall thicknesses according to the employed shape the cavities.

In general, molds have hitherto been thought of as merely carriers for the confectionery product mass; they have not been considered as forming part of the production process.

EP 0 429 969 B1 describes a chocolate mold formed of plastic material having circular openings in the frame which guide the cooling air stream through the underside of the chocolate mold. The specific design of said chocolate mold enables an accelerated, more homogenous cooling/heating of the chocolate mass during the production process.

The development of a computational model which can predict the cooling behavior of chocolate in a simple chocolate mold during the commercial manufacture is described in the article "*Modelling temperature distributions in cooling chocolate moulds*" by P. J. Fryer et al. However, no detailed design of chocolate molds having improved cooling/heating characteristics is mentioned.

SUMMARY OF THE INVENTION

It is therefore an object of the present invention to provide a mold for the production of confectionery products which has improved heat transfer properties, and a process for the production of confectionery products.

This object is achieved by a mold according to claim 1. Preferred embodiments of the invention are defined in the dependent claims.

The present invention provides a novel mold with optimized heat transfer properties for the production of confectionery products.

The mold according to the present invention comprises protruding elements at the bottom surface of the mold for increasing the heat transfer rate between the mold and a fluid flowing along the bottom surface, and for directing the fluid through the cavities to facilitate the heat transfer.

The idea of this invention is to improve the heat transfer rate between the mold and the fluid in the heating and cooling tunnels used during chocolate manufacturing by changing the fluid flow characteristics along the molds and if needed by material with higher heat conductivity.

Generally, flow properties and the heat transfer rate are coupled by dynamic and thermal laws of similarity. The idea is to generate a more intense and turbulent flow along the mold which gives a higher energy transport (Nu=f(Re); wherein Re is the Reynolds number and Nu is the Nusselt number). Said more intense and turbulent flow along the mold is achieved via the specific design of the mold according to the present invention.

Thus, the specific design of the mold according to the present invention is driven by fluid-dynamic and thermal aspects. The mold is considered as part of the process equipment and as having influence on process parameters and conditions, such as energy consumption.

This further leads to new processing conditions and new design criteria for heating and cooling devices, the optimization of which giving rise to significant advantages in the chocolate production (e.g. energy saving). For example, said reduction of the energy amount needed for cooling and heating processes increases technical efficiency with a positive financial impact and an environmental benefit. Alternatively, the increase in technical efficiency can be used to increase the line speed and thus the throughput of the production line.

Another advantage of such energy optimized molds in the confectionery production process is the potential for the reduction of the space requirement of the processing lines, which further reduces the overall costs of manufacturing.

Moreover, the specific design of the mold according to the present invention allows the confectionery mass to be solidified more homogenously than using a conventional mold without deterioration in product quality (i.e. without fat- and sugar-blooming caused by condensation) and without the investment, operation and maintenance costs associated with using conventional molds.

DETAILED DESCRIPTION OF PREFERRED EMBODIMENTS

Preferred embodiments of the mold (1) for the production of confectionery products according to the present invention are described below in more detail.

Figure 1:
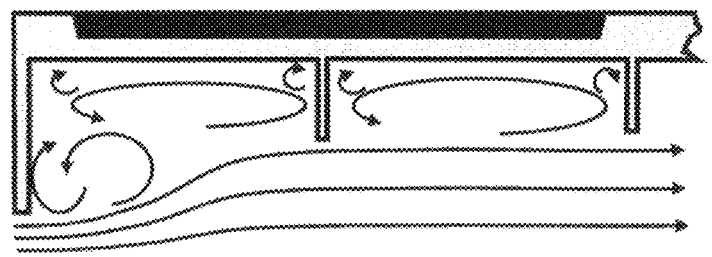
FIG. 1: Schematic diagram illustrating the generation of dead zones and stationary vortices in the current flow field which inhibit the heat transfer.
Figure 2:
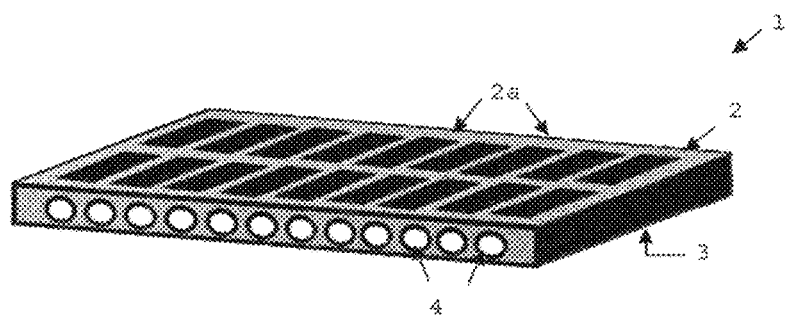
FIG. 2: Schematic diagram illustrating a top-side view of an energy optimized mold (1) according to the present invention.
Figure 3:
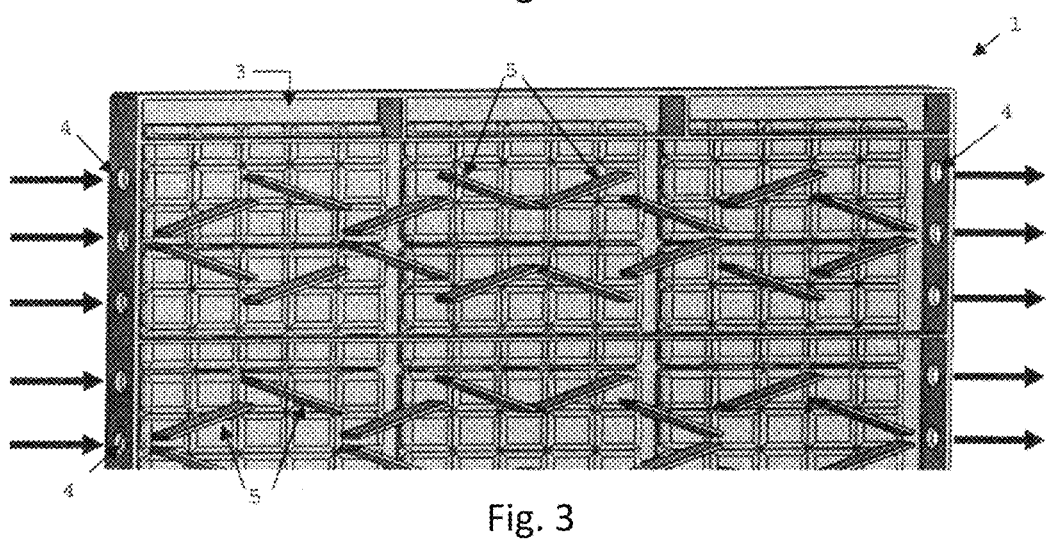
FIGS. 3-4: Schematic diagrams illustrating various examples of bottom-side views of an energy optimized mold (1) according to the present invention.

In one embodiment, the mold (1) according to the present invention (see FIGS. 2 and 3) comprises a top surface (2) having cavities (2a) and an opposite bottom surface (3), comprising (i) at least one opening (4) in at least one of the side faces of the mold (1) for supplying a fluid to the bottom surface (3), and (ii) at least one vortex generating element (5) at the bottom surface (3) of the mold (1) for increasing the heat transfer rate between the mold (1) and the fluid. It is to be noted, however, that the provision of openings (4) is not mandatory, and that flow fluid may flow along the mold via various routes.

The shape of the mold (1) according to the present invention is not particularly limited, and the mold can have, for instance, a rectangular, longitudinally extending top surface (2) or a quadratic extending top surface (2).

The top surface of the mold (1) according to the present embodiment has cavities for the liquid confectionery mass/final confectionery product. The shape of said cavities (2a) is not particularly limited; the cavities can, for instance, be in the form of a block or tablet (with or without breakable portions), a thin sheet or slice, an individual portion or a bar.

The side faces form the rim of the mold (1). In the present embodiment, at least one of the side faces of the mold (1) has at least one opening (4) for supplying a fluid to the bottom surface (3) of the mold (1). The shape of the opening (4) is not particularly limited and can be, for instance, circular or rectangular. Preferably, openings (4) are provided in two opposing side faces of the mold (1) so that a flow path can be provided between the opposing side faces to supply a flow of fluid along the bottom surface (3) the mold (1). The provision of more openings (4) in the opposite side faces of the mold (1) can improve the cooling/heating of the mold (1) during the production process.

In addition, the mold (1) can further comprise at least one opening (4) in the top surface (2) of the mold (1) for a more homogenous and more rapid cooling/heating of the mold during the manufacturing.

The bottom surface has at least one protruding element (5) at the bottom surface (3) of the mold (1) for increasing the heat transfer rate between the mold (1) and the fluid by changing the fluid flow characteristics. The protruding elements (5) change the fluid flow characteristics by producing a more intense and turbulent flow along the mold (1) so that the cooling/heating of the mold (1) is accelerated.

Preferably, the at least some protruding elements are shaped as vortex generating elements (5) that generate vortices in the fluid which increase the heat transfer rate between the warm/cold mold (1) and the fluid by virtue of higher convection. Due to these vortices the fluid will be mixed more intensely which results in having a more homogeneous temperature distribution across the mold, i.e. avoidance of stationary vortices and/or cold/hot spots in, for instance, dead corners. The vortices, which are generated at the bottom surface of the mold (1), will have, depending on the design of these elements, the above mentioned effects on the bottom surface of the mold (1) as well as on the top surface of the mold (1).

The shape of the vortex generating elements (5) is not particularly limited, as long as the elements produce a more intense and/or turbulent flow along the mold (1) and generate a flow field which gives a higher heat transfer rate in total.

When using the mold for the production of confectionery products, a confectionery material is introduced into at least one cavity of the mold. Subsequently, the confectionary material is processed in at least one cycle of supplying one of a cooling fluid and a heating fluid to the mold such that the fluid flows along the bottom surface of the mold. During the cycle(s), the fluid flows along at least one protruding element so as to increase the heat transfer rate between the mold and the fluid.

The protruding elements (5) may each be independently attached to the bottom surface of the mold (1) according to the present invention and do not necessarily form parts of the cavities (2a).

In a further embodiment, at least some protruding elements (5) may be arranged to provide angularly offset portions relative to a direction parallel to the fluid flow between the side faces of the mold. In particular, the offset portions may be oriented according to either one of two offset angles relative to a direction parallel to the fluid flow.

Figure 6A:
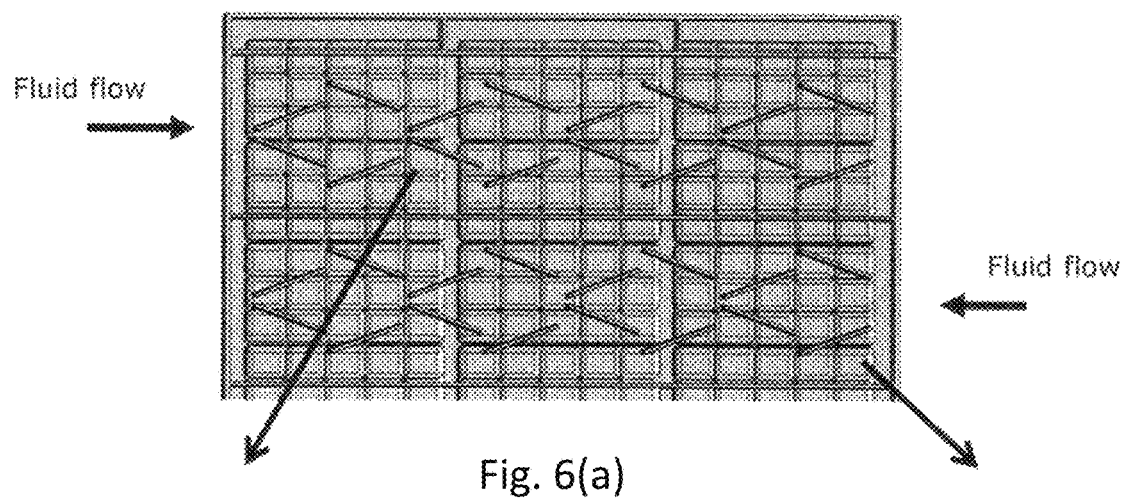
FIGS. 6-7: Schematic diagrams illustrating various molds (1), wherein the vortex generating elements (5) are arranged in alternating diverging and converging opposing pairs extending from one side face having openings (4) to the other side face having openings (4), the alternating divergence and convergence being along a direction parallel to the fluid flow, the diagrams also depicting influence of the arrangement of said vortex generating elements on the resulting fluid flow.
Figure 6B:
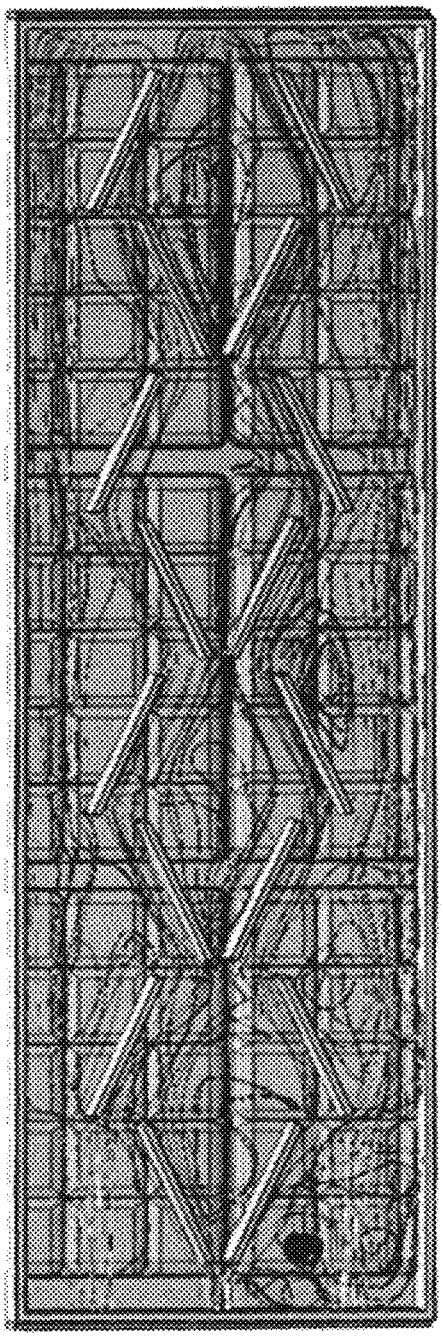
Figure 6C:
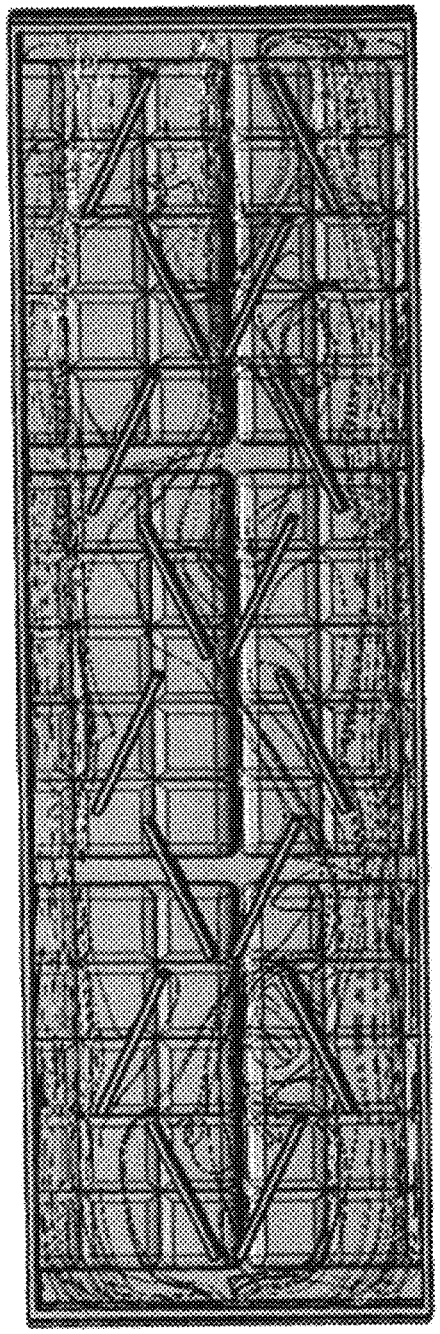
Figure 7:
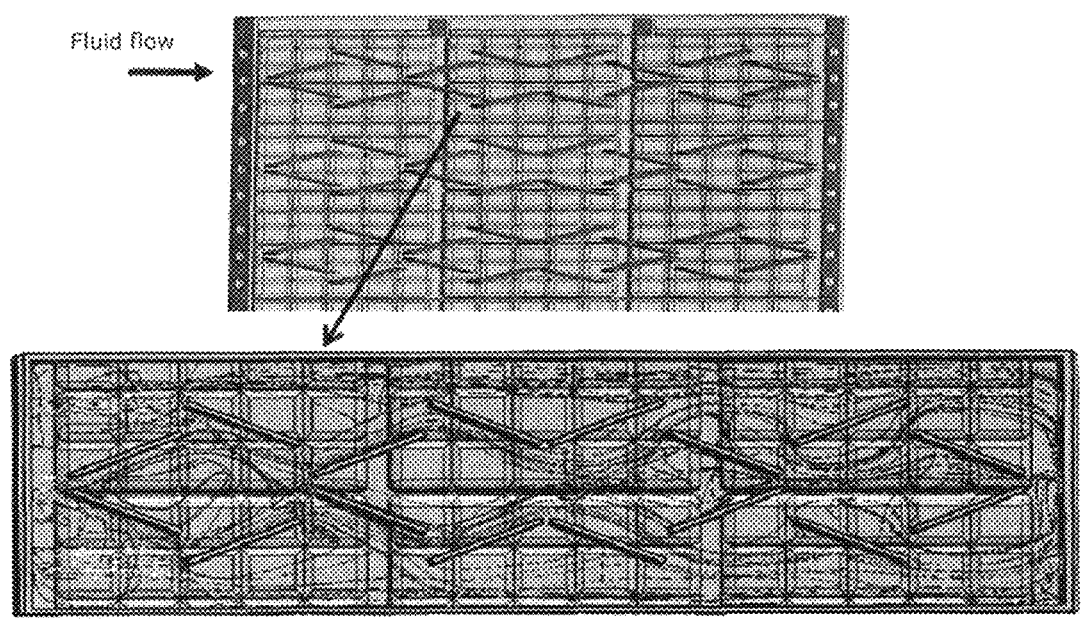

In an alternative embodiment, at least some protruding elements (5) may be arranged in alternatively diverging and converging opposing pairs extending from one side face having openings (4) to the other side face having openings (4), the alternating divergence and convergence being along a direction parallel to the fluid flow. Molds (1) which have vortex generating elements (5) according to the embodiment described above are illustrated in FIGS. 3, 6, and 7.

Figure 4:
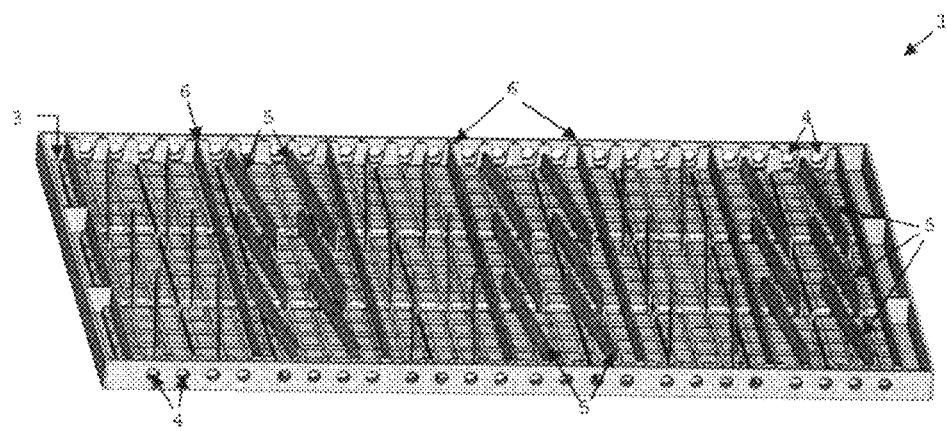
Figure 5:
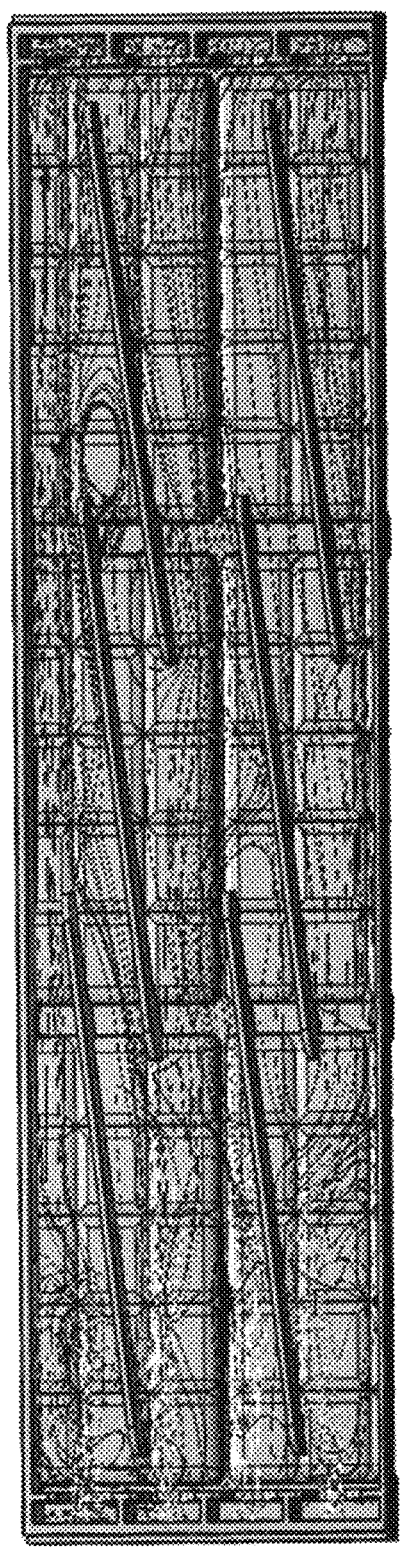
FIG. 5: Schematic diagram illustrating vortex generating elements (5) arranged such that they are angularly offset relative to a direction parallel to the fluid flow between the side faces of the mold (1) according to the present invention, guiding the fluid flow and generating heat flux.

In another embodiment, at least some protruding elements (5) are arranged in blocks, extending from one side face having openings (4) to the other side face having openings (4), and are separated by strengthening ribs (6), in a direction parallel to the fluid flow. A mold (1) according to the embodiment described above is shown in FIG. 4. The fluid flow and generated heat flux as result of the vortices generated by the protruding (vortex generating) elements (5) is further shown in FIG. 5.

The use of blocks of protruding elements (5) facilitates greater control over the heat transfer distribution between the mold (1) and fluid.

In an alternative embodiment, at least some protruding elements (5) are arranged in blocks and further arranged to provide angularly offset portions relative to a direction parallel to the fluid flow between the side faces of the mold. The offset portions may be oriented according to either one of two offset angles relative to a direction parallel to the fluid flow.

Where the protruding elements (5) are arranged in blocks and in either one of two offset angles as described above, any one block may contain elements arranged in only one of the two orientations or, alternatively, any one block may contain elements arranged in both orientations. In the former configuration, adjacent blocks may contain elements configured in alternating orientations, e.g. with a given block in one orientation being positioned in between two blocks with the alternative orientation.

As already described above, the fluid is not particularly limited; said fluid can be, for instance, cooling air or heating air. Alternatively, the fluid can be water or another medium for cooling/heating the mold/product system during the manufacturing process.

The material of mold (1) is not particularly limited; the material can, for instance, be a polycarbonate (e.g. Makrolon, Lexan or Tarflon), preferably a material with higher heat conductivity and preferably a material with higher rigidity against physical tension or both.

Figure 8:
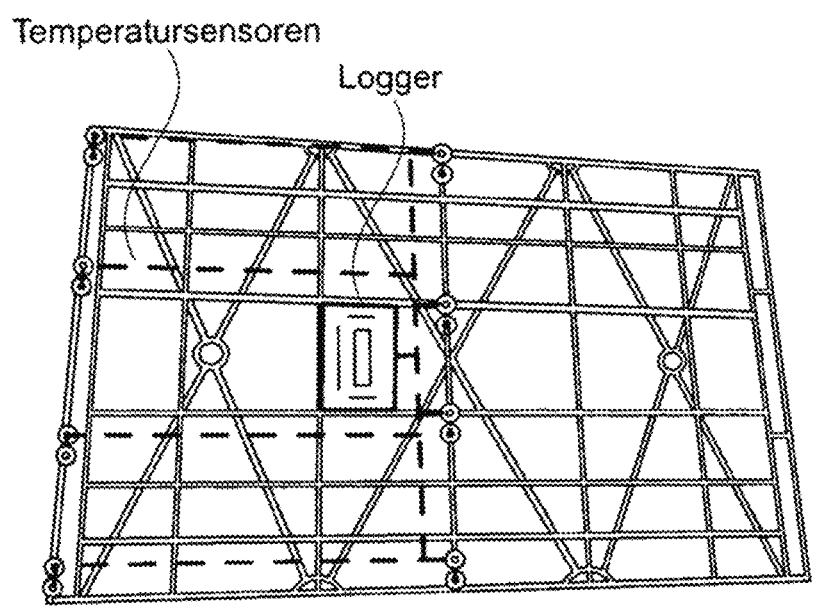
FIG. 8: Schematic diagram illustrating measurements of online processing parameters and line performances with the help of temperature sensors and loggers attached to the mold (1) according to the present invention.
Figure 8:
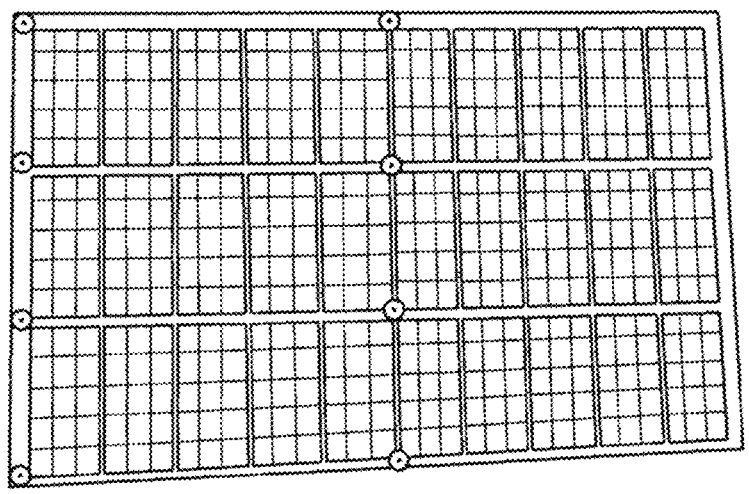

In a further embodiment, the mold (1) according to present invention further comprises at least one temperature sensor and/or at least one logger for controlling of the temperature distribution during the manufacturing process. FIG. 8 illustrates a mold employing temperature sensors and a logger for the measurement of online processing parameters and line performances.

The use of a mold (1) according to any one of the preceding embodiments for the production of confectionery products is advantageous in that it has optimized heat transfer properties, thereby generally reducing the overall energy consumption of the manufacturing process.

The confectionery product is sugar (or sugar-substitute) and fat based. Examples include chocolate, caramel, toffee and confectionery emulsions. Preferably, the confectionery product is chocolate, i.e. the confectionery mass comprises, or consists of, tempered chocolate, meaning that the chocolate has undergone controlled heating and cooling.

The shape of the confectionery product produced with the mold (1) according to the present invention is not particularly limited; the confectionery product can, for instance, be a block or tablet (with or without breakable portions), a thin sheet or slice, an individual portion or a bar.

The process for the production of confectionery products, wherein the confectionery product is contained in the mold (1) according to the present invention is advantageous, since the energy optimized mold (1) ensures a more homogenous solidifying during the manufacturing process and further reduces the energy consumption of the production line.

The invention claimed is:

1. A mold for the production of confectionery products, comprising
    a top surface having cavities and an opposite bottom surface, comprising
    a plurality of protruding elements at the bottom surface of the mold, and opposite at least one of the cavities, for increasing the heat transfer rate between the mold and a fluid flowing along the bottom surface, wherein at least some of the protruding elements are at non-parallel angles relative to others of the protruding elements;
    wherein at least some protruding elements are arranged in blocks, extending from one side face having openings to the other side face having openings, and separated by strengthening ribs, in a direction parallel to the fluid flow.

2. The mold according to claim 1, further comprising at least one side face in which at least one opening is provided for supplying a fluid to the bottom surface, at least one opening preferably being provided in each of two opposing side faces of the mold.

3. The mold according to claim 1, further comprising at least one opening in the top surface of the mold.

4. The mold according to claim 1, wherein the protruding elements are configured to generate vortices in the fluid flowing along the bottom surface and preferably to change the fluid flow characteristics along the mold by effecting a more turbulent flow of the fluid.

5. The mold according to claim 1, wherein one or more of the protruding elements are arranged to provide angularly offset portions relative to a direction parallel to the fluid flow between the side faces.

6. The mold according to claim 5, wherein the offset portions are oriented according to either one of the two offset angles relative to a direction parallel to the fluid flow.

7. The mold according to claim 5, wherein at least some protruding elements are arranged in alternating diverging and converging opposing pairs extending from one side face having openings to the other side face having openings, the alternating divergence and convergence being along a direction parallel to the fluid flow.

8. The mold according to claim 1, wherein at least some protruding elements are arranged in blocks and the offset portions are oriented according to either one of two offset angles relative to a direction parallel to the fluid flow.

9. The mold according to claim 1, wherein one or more protruding elements are configured to guide the fluid flow along the bottom surface of said mold.

10. The mold according to claim 1, wherein the fluid is cooling air or heating air.

11. The mold according to claim 1, wherein the mold is at least partially made of polycarbonate.

12. The mold according to claim 1, further comprising at least one temperature sensor and a logger.

* * * * *